US011076264B2

(12) United States Patent
Nowakowski et al.

(10) Patent No.: US 11,076,264 B2
(45) Date of Patent: Jul. 27, 2021

(54) LOCALIZATION OF A MOBILE DEVICE BASED ON IMAGE AND RADIO WORDS

(71) Applicants: SOFTBANK ROBOTICS EUROPE, Paris (FR); ARMINES, Paris (FR)

(72) Inventors: Mathieu Nowakowski, Paris (FR); Cyril Joly, Paris (FR); Scarlett Fres, Paris (FR); Nicolas Garcia, Paris (FR); Fabien Moutarde, Paris (FR)

(73) Assignees: SOFTBANK ROBOTICS EUROPE, Paris (FR); ARMINES, Paris (FR)

( * ) Notice: Subject to any disclaimer, the term of this patent is extended or adjusted under 35 U.S.C. 154(b) by 0 days.

(21) Appl. No.: 16/648,642

(22) PCT Filed: Sep. 24, 2018

(86) PCT No.: PCT/EP2018/075739
§ 371 (c)(1),
(2) Date: Mar. 18, 2020

(87) PCT Pub. No.: WO2019/057954
PCT Pub. Date: Mar. 28, 2019

(65) Prior Publication Data
US 2020/0236504 A1 Jul. 23, 2020

(30) Foreign Application Priority Data

Sep. 22, 2017 (EP) ..................................... 17306252

(51) Int. Cl.
*H04W 4/029* (2018.01)
*H04W 4/024* (2018.01)
(Continued)

(52) U.S. Cl.
CPC ........... *H04W 4/029* (2018.02); *G01S 5/0252* (2013.01); *H04W 4/024* (2018.02); *H04W 4/30* (2018.02); *H04W 4/33* (2018.02); *H04W 64/003* (2013.01)

(58) Field of Classification Search
CPC ... H04W 4/00–043; H04W 4/38; H04W 4/70; H04W 4/80; H04W 88/00–06; G01S 5/0252
See application file for complete search history.

(56) References Cited

U.S. PATENT DOCUMENTS 8,938,355 B2* 1/2015 Das .......................... H04W 4/02
701/408
10,217,120 B1* 2/2019 Shin .................. G06Q 10/06393
(Continued)

FOREIGN PATENT DOCUMENTS

| EP | 2 952 300 A1 | 12/2015 |
| EP | 2 952 993 A1 | 12/2015 |
| WO | 2011/144968 A1 | 11/2011 |

OTHER PUBLICATIONS

Cummins, et al., "FAB-MAP: Probabilistic localization and mapping in the space of appearance", The International Journal of Robotics Research, vol. 27, No. 6 pp. 647-665, 2008, Best Available Date: Apr. 10, 2008.
(Continued)

*Primary Examiner* — San Htun
(74) *Attorney, Agent, or Firm* — BakerHostetler (57) ABSTRACT

A mobile device that is able to locate itself in a topological map using a combination of visual and radio information is provided. The mobile device captures an image of its environment, detects receivable radio transmitters and builds an observation vector that defines visual words and radio words that are present at the current location of the mobile device. It then compares this observation vector to (Continued)

reference vectors corresponding to reference location and identifies, based on correlations between visual words and radio words, the location of the mobile device among reference locations.

11 Claims, 7 Drawing Sheets

(51) Int. Cl.
    *H04W 4/30*     (2018.01)
    *H04W 4/33*     (2018.01)
    *G01S 5/02*     (2010.01)
    *H04W 64/00*     (2009.01)

(56) References Cited

U.S. PATENT DOCUMENTS

| | | | | |
|---|---|---|---|---|
| 2012/0046044 | A1* | 2/2012 | Jamtgaard | H04N 7/181 455/456.1 |
| 2017/0090007 | A1* | 3/2017 | Park | H04W 4/33 |

OTHER PUBLICATIONS

Cummins, et al., "Appearance-only SLAM at large scale with FAB-MAP 2.0", The International Journal of Robotics vol. 30, No. 9, Jul. 25, 2011.

Sivic, et al., "Video Google: A text retrieval approach to object matching in videos", Proceedings of the Ninth IEEE International Conference on Computer Vision, Oct. 2003.

Schwiegelshohn, et al., "Localization based on fusion of RFID and stereo image data", Positioning Navigation and Communication (WPNC), pp. 1-6, 2013.

Quigley, et al., "Sub-meter indoor localization in unmodified environments with inexpensive sensors", International Conference on Intelligent Robots and Systems (IROS), 2010 IEEE/RSJ, pp. 2039-2046, 2010, Best Available Date: Oct. 18-22, 2010.

Nowicki, "WiFi-guided visual loop closure for indoor navigation using mobile devices", Journal of Automation, Mobile Robotics and Intelligent Systems, vol. 8, No. 3, 2014, Best Available Date: Jun. 11, 2014.

Biswas, et al., "Multi-sensor mobile robot localization for diverse environments", Robot Soccer World Cup, pp. 468-479, Jun. 2013.

Wietrzykowski, et al., "Adopting the FAB-MAP algorithm for indoor localization with WiFi fingerprints", 2016, Best Available Date: Nov. 7, 2016.

* cited by examiner

LOCALIZATION OF A MOBILE DEVICE BASED ON IMAGE AND RADIO WORDS

CROSS-REFERENCE TO RELATED APPLICATIONS

This application is a National Stage of International patent application PCT/EP2018/075739, filed on Sep. 24, 2018, which claims priority to foreign European patent application No. EP 17306252.2, filed on Sep. 22, 2017, the disclosures of which are incorporated by reference in their entirety.

FIELD OF THE INVENTION

The present invention relates to the field of mobile device localization. More specifically, it relates to the determination of the localization of a mobile device among a set of possible reference locations.

BACKGROUND PRIOR ART

Indoor localization of mobile devices, for example robots, is becoming a growing need, as affordable mobile robots interacting with humans are massively deployed. This raises the need for low-cost solutions enabling the robots to map their environment, and constantly know where they are when they move in it. However, most current solutions rely on the use of expensive sensors, such as laser range finders, and are designed for specific platforms.

The documents Cummins, M., & Newman, P. (2008). FAB-MAP: Probabilistic localization and mapping in the space of appearance. *The International Journal of Robotics Research*, 27(6), 647-665 and Cummins, M., & Newman, P. (2011). Appearance-only SLAM at large scale with FAB-MAP 2.0. *The International Journal of Robotics Research*, 30(9), 1100-1123 disclose the FABMAP (Fast Appearance-Based Mapping Algorithm) algorithm that provides a low-cost localization solution based on the use of image sensors.

The FABMAP algorithm splits the environment into a succession of topological nodes, each node constituting a location $L_i$ associated with one or more visual observations. The images relative to each location are analyzed in order to determine visual words which appeared in the image as disclosed for example by Sivic, J., & Zisserman, A. (2003, October). Video Google: A text retrieval approach to object matching in videos. *In Computer Vision, 2003. Proceedings. Ninth IEEE International Conference on* (p. 1470). IEEE. A reference vector that contains binary indicating if each visual word is present in a location is thus defined for each location.

When the robot uses a camera to capture an image, the FABMAP algorithm analyses the image, in order to determine which visual words are contained in the image. It then builds an observation vector comprising binary values, each binary value defining if a visual word is present in the image, and calculates the probability for the robot of being in each location, by comparing the observation vector and the reference vectors associated with each location. FABMAP determines that the robot is in the location having the highest probability of presence.

Localization algorithms based on visual features such as FABMAP provide a precise localization solution at an affordable cost, since they use affordable sensors present on most robots. However, they face the problem of perceptual aliasing. This problem arises when two different locations share similar appearance and visual features. This problem is often encountered in repetitive environments, such as offices, car parks, or more generally any indoor environment characterized by regular visual patterns. This problem generates a large number of false localizations, and thus greatly reduces the robustness of localization algorithms based on visual features.

Recent work aimed at merging Wi-Fi and visual data, in order to improve localization. For example, Schwiegelshohn, F., Nick, T., & Götze, J. (2013, March). Localization based on fusion of rfid and stereo image data. In *Positioning Navigation and Communication (WPNC), 2013 10th Workshop on* (pp. 1-6). IEEE and Quigley, M., Stavens, D., Coates, A., & Thrun, S. (2010, October). Sub-meter indoor localization in unmodified environments with inexpensive sensors. In *Intelligent Robots and Systems (IROS), 2010 IEEE/RSJ International Conference on* (pp. 2039-2046). IEEE use particle filters for fusing Wi-Fi and visual localizations. However, in these solutions the particle filter converges only with motion.

Nowicki, M. (2014). WiFi-guided visual loop closure for indoor navigation using mobile devices. *Journal of Automation Mobile Robotics and Intelligent Systems*, 8(3), 10-18 defines a set of possible locations from Wi-Fi data, and perform a visual localization over it. Biswas, J., & Veloso, M. (2013, June). Multi-sensor mobile robot localization for diverse environments. In *Robot Soccer World Cup* (pp. 468-479). Springer, Berlin, Heidelberg performs a localization based either on visual or Wi-Fi data, and chooses which sensor is the most reliable for current estimation. However, these two solutions would suffer greatly from one misled sensor.

Therefore, none of the prior art solutions provide a robust localization solution at an affordable cost, and there is a need for a mobile device which is able to locate itself precisely in an indoor environment using widely available and affordable sensors, while providing a robust and reliable localization in any case.

SUMMARY OF THE INVENTION

To this effect, the invention discloses a mobile device comprising: one or more digital image sensors; a radio receiver; a communication link to one or more memories storing: a set of visual words; a set of radio words, a radio word being defined at least by an identifier of a radio transmitter; a set of reference locations, each reference location having associated therewith a reference location vector comprising binary values defining respectively the presence or absence, at the corresponding reference location, of visual words and radio words; a communication link to a processing logic comprising: an adaptation to acquire an image of an environment of the mobile device from said one or more digital image sensors; an adaptation to detect receivable radio transmitters using said radio receiver; an adaptation to create an observation vector comprising binary values defining the presence or absence of visual words in the image, and binary values defining the presence or absence of radio words; an adaptation to determine the current location of the mobile device at least among the set of reference locations based on said observation vector and said reference locations vectors in receivable radio transmitters.

In this application, the term "visual word" is to be understood as its usual meaning in the field of localization and image analysis. Thus a visual word is a word of vocabulary that can correspond to keypoints of an image.

In this application, the term "radio word" defines, by analogy with the term "visual word", elements that allow a characterization of the features of radio signals received by the mobile device. For example, a radio word may be characterized by an identifier of a radio transmitter. A radio word may also be defined by a combination of an identifier of a radio transmitter, and a range of corresponding signal strength. In an embodiment using Wi-Fi signals, the radio words may be detected using a Wi-Fi signature. For example, a Wi-Fi word may be defined by a MAC address of an Access Point, or a combination of a MAC address of an Access Point and a strength of the signal received from the Access Point.

A radio transmitter is considered as "receivable" when the radio waves that it emits are received by the radio receiver of the mobile device, and if the radio transmitter can be identified using said radio waves.

In this application, a processing logic may be a processor operating in accordance with software instructions, a hardware configuration of the processor, or a combination thereof. It should be understood that any or all of the functions discussed herein may be implemented in a pure hardware implementation and/or by a processor operating in accordance with software instructions and/or by a processor operating in accordance with software instructions, and a configuration of a machine learning engine or neural network. A processing logic may also be a multi-core processor executing operations in parallel, a series of processors, or a combination thereof. It should also be understood that any or all software instructions may be stored in a non-transitory computer-readable medium. The term "adaptation of a processing logic" refers to any means (for example hardware configuration, software instructions, machine learning, training or neural network, or any other adaptation means or combination thereof) of adapting a processing logic to execute operations.

The use of visual words to locate the mobile device allows a precise localization, by identifying precise features in the image from the camera that belong to precise locations. However, the same visual words can be detected in very distant images.

The use of radio words to locate the mobile device is very robust, when it is used with radio transmitters that have fixed locations.

Therefore, localization based on an observation vector and reference location vectors comprising both visual words and radio words benefits in the same time of the robustness of radio localization, and the precision of the detection of visual words, whatever the operational conditions of the mobile device. Meanwhile, this solution can be implemented affordably, since visual and radio receivers are affordable and commonly used equipment of most mobile devices.

Advantageously, the adaptation to determine the current location of the mobile device comprises an adaptation to perform a calculation, for a reference location vector, of a likehood of observing the observation vector when the mobile device is in the corresponding reference location.

The calculation of a likehood of observing the observation vector when the robot is in the corresponding reference location allows an efficient comparison of the likehoods of observing the observation vector when the mobile device is in each reference location. This therefore provides an efficient way of determining the best candidate for the current location of the robot.

Advantageously, said calculation, for said reference location vector, of the likehood of observing the observation vector when the robot is in the corresponding reference location is based on the observation vector, the reference location vector, and a correlation tree of elements of the observation and reference location vectors.

The likehoods that the observation vector is observed in each reference location can be performed by simple comparisons, for example by counting the number of shared positive values among binary values in the observation and a reference location vector. However, this is not representative of the correlations that exist between visual and radio words. On the contrary, using a tree of correlations of elements of the observation and reference location vectors allow calculating likehoods of observing the observation vector while taking into account the correlations between words, for example the visual and/or radio words that occur in the same vectors during a learning phase.

Advantageously, the processing logic further comprises, when said adaptation to determine if a current location of the mobile device is in one of said reference locations has determined that the mobile device is in none of said reference locations, an adaptation to add a further reference location having as reference location vector the observation vector in the set of reference locations.

This adds a new location vector in locations that was not previously visited by the mobile device.

In a longer period of time, this allows the set of locations to comprise all locations already visited by the mobile device, associated with a relevant reference vector.

Advantageously, the set of radio words is built during a single training phase, comprising a detection of radio transmitters during an exploration of said environment.

This allows a finer control of the of radio words that can be detected and integrated in the set of radio words. For example, the environment of the mobile device can be explored at night, when only the fixed radio transmitters of the environment are receivable. Thus, only fixed radio transmitters are used for localization. This renders the localization more precise and robust.

Advantageously, the processing logic further comprises, when said adaptation to detect receivable radio transmitters using said radio receiver has detected a receivable radio transmitter associated to none of the radio words, an adaptation to add a radio word associated to said receivable radio transmitter in said set of radio words.

This allows the mobile device to start localization without needing a training phase. Moreover, the radio words can be added as and when corresponding radio transmitters are detected.

Advantageously, said adaptation to add a radio word associated to said receivable radio transmitter comprises an adaptation to modify the reference location vectors to add: a binary value indicating the presence of said radio word in the reference vector corresponding to current location; a binary value indicating the absence of said radio word in each other reference location.

When a new radio word is identified, it can be assumed that, since it has not been detected before, it is absent from all the previously added reference locations, but present in the current location. Therefore, indicating that this newly added radio word is present in the current location, and absent from previously added reference locations adds additional location information that is presumed to be exact, and therefore renders future localization more robust.

Advantageously, said adaptation to determine the current location of the mobile device comprises an adaptation to compute, for each reference location, a likehood of observing the observation vector when the mobile device is in said reference location, based on said reference location vector and correlations between elements of observations and reference vectors.

The correlations of elements of observations or reference location vectors indicate the visual words and/or radio words that are present in the same time in a location or observations. They provide more robust and precise indications on the location in which the mobile device may be. Therefore, comparing such correlations improves the reliability and efficiency of the localization of the mobile device.

Advantageously, said adaptation to compute, for each reference location, a likehood of observing the observation vector when the mobile device is in said reference location comprises adaptations to separately compute correlations of elements associated to visual words, and elements associated to radio words.

The visual words and radio words may have specific correlations. Comparing separately the correlations of the binary values representative of the presence or absence of visual words and the presence or absence of radio words therefore allows analyzing more precise correlations, and improves the reliability of mobile device localization.

Advantageously, said adaptation to determine the current location of the mobile device comprises an adaptation to compute the probability of observing the observation vector when the mobile device is in an unknown location based on a set of artificial reference location vectors built using an artificial list of receivable radio transmitters randomly generated from at least the set of radio words.

The use of randomly generated lists of radio transmitters, comprising radio transmitters present in the environment of the mobile device provides an efficient way of artificially generating observations comprising radio words that, although being artificial, contain radio words from the set of radio words, and are therefore associated to a non null probability of observing the observation vector, in an artificial use cases when the mobile device would be in the artificial locations.

Advantageously, the radio words are further defined by a range of signal strength received from the corresponding radio transmitter; said adaptation to create an observation vector comprises an adaptation to indicate that a radio word is present in the observation vector, if the radio receiver receives a signal from a corresponding radio transmitter with a corresponding signal strength.

The strength of the signal received from a radio transmitter provides an insight about the localization of the mobile device, since it depends, at least in part, on the distance from the mobile device to the radio transmitter. Therefore, using the strength of signal received from the radio transmitter to build radio words increase the precision of the localization of the mobile device.

This is even more the case when correlations between the presence or absence of radio words are used. Indeed, the correlations between radio words representative of both a radio transmitters and the strength of signal received therefrom provides an reliable insight into the relative distance of the mobile device from the radio transmitters, and therefore a reliable insight into the localization of the mobile device.

Advantageously, said adaptation to determine the current location of the mobile device further comprises adaptations to: calculate probabilities that the mobile device is in each reference location based on said observation vector and said reference location vectors; determine that the current location of the mobile device is the reference location having the highest probability.

In cases wherein no reference location vector exactly matches the observations vector, calculating a probability that the current location of the mobile device matches reference locations based on a comparison between the observation vector and the corresponding reference location vector, and selecting the location having the highest probability, allows an effective comparison of the reference location which is the most likely to be the actual location of the mobile device.

Advantageously, said adaptation to calculate probabilities that the mobile device is in each reference location furthermore comprises an adaptation to calculate a probability that the mobile device is in an unknown location; the sum of the probabilities that the mobile device is in the reference locations, and the probability that the mobile device is in an unknown location is equal to 1.

In cases when the mobile device has not explored its whole environment previously, the mobile device may be located in an unknown location. Therefore, calculating a probability that the mobile device is in an unknown location allows determining if the mobile device has a higher chance of being in one of the reference locations or a new, unknown location, and add a new location in the set of reference locations accordingly.

The invention also discloses a method comprising: acquiring an image of the environment of a mobile device from one or more digital image sensors onboard the mobile device; detecting receivable radio transmitters using a radio receiver onboard said mobile device; accessing a memory storing: a set of visual words; a set of radio words, a radio word being defined at least by an identifier of a radio transmitter; a set of reference locations, each reference location having associated therewith a reference location vector comprising binary values defining the presence or absence, at the corresponding reference location, of visual words and radio words; creating an observation vector comprising binary values defining the presence or absence of visual words in the image, and binary values defining the presence or absence of radio words in receivable radio transmitters; determining if a current location of the mobile device is in one of said reference locations based on said observation vector and said reference location vectors.

The invention also discloses a computer program product comprising computer code instructions configured to: acquire an image of the environment of a mobile device from one or more digital image sensor onboard the mobile device; detect receivable radio transmitters using a radio receiver onboard said mobile device; access a memory storing: a set of visual words; a set of radio words, a radio word being defined at least by an identifier address of a radio transmitter; a set of reference locations, each reference location having associated therewith a reference location vector comprising binary values defining the presence or absence, at the corresponding reference location, of visual words and radio words; create an observation vector comprising binary values defining the presence or absence of visual words in the image, and binary values the presence or absence of radio words using receivable radio transmitters; determine if a current location of the mobile device is in one of said reference locations based on said observation vector and said reference location vectors.

BRIEF DESCRIPTION OF THE DRAWINGS

The invention will be better understood and its various features and advantages will emerge from the following description of a number of exemplary embodiments provided for illustration purposes only and its appended figures in which.

DETAILED DESCRIPTION OF THE INVENTION

Figure 1:
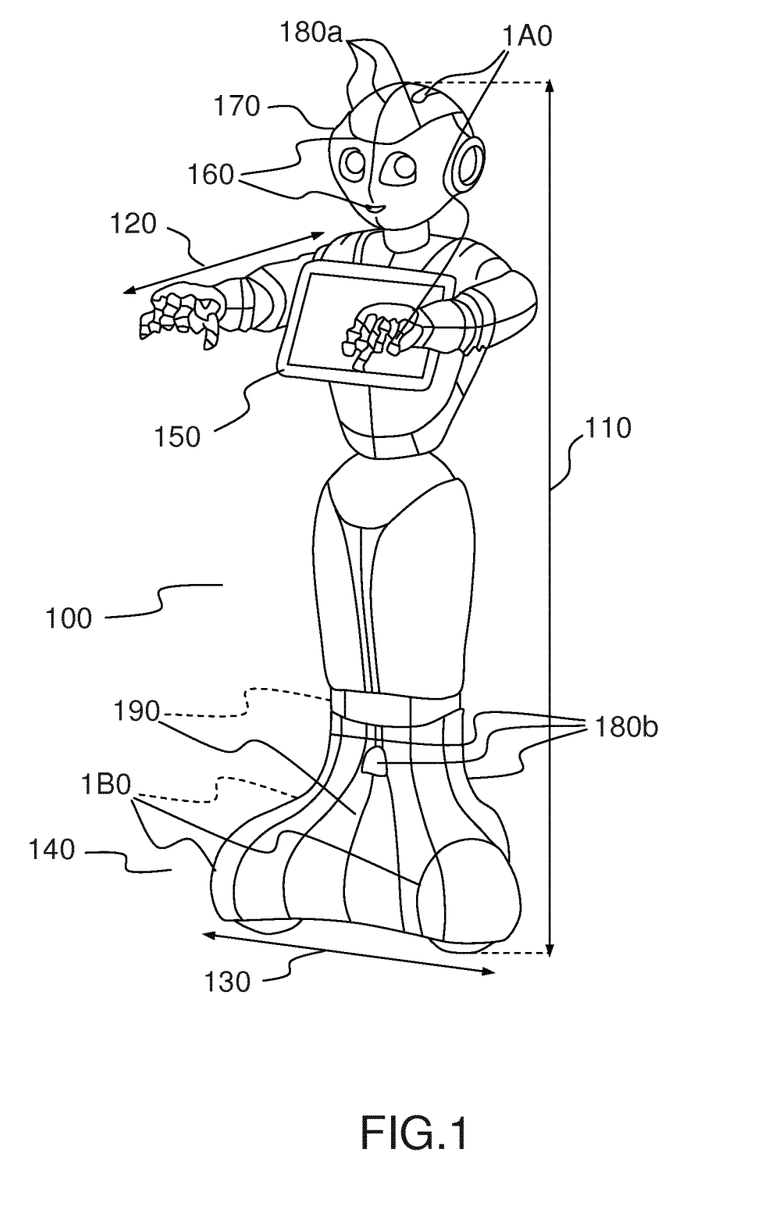
FIG. 1 displays a physical architecture of a robot in a number of embodiments of the invention.

FIG. 1 displays a physical architecture of a robot in a number of embodiments of the invention.

It should be noted that the robot 100 is provided by means of example only of a mobile device in which the invention can be implemented. Although the robot 100 is a humanoid robot, the invention can be implemented to other kind of mobile robots, such as pet robots, or wheeled robots, provided that the robot is able to displace itself in its environment, capture images and is equipped with a Wi-Fi module. The invention is also applicable to other kind of mobile device that comprising imaging capabilities, radio reception capabilities and a link to computing capabilities. For example, the invention is applicable to a drone, a smartphone or an autonomous car.

The lower limb of the robot on the figure is not functional for walking, but can move in any direction on its base 140 which rolls on the surface on which it lays. The invention can be easily implemented in a robot which is fit for walking. By way of example, this robot has a height 110 which can be around 120 cm, a depth 120 around 65 cm and a width 130 around 40 cm. In a specific embodiment, the robot of the invention has a tablet 150 with which it can communicate messages (audio, video, web pages) to its environment, or receive entries from users through the tactile interface of the tablet. In addition to the processor of the tablet, the robot of the invention also uses the processor of its own motherboard, which can for example be an ATOM™ Z530 from Intel™. The robot of the invention also advantageously includes a processor which is dedicated to the handling of the data flows between the motherboard and, notably, the boards bearing the Magnetic Rotary Encoders (MREs) and sensors which control the motors of the joints in a limb and the balls that the robot uses as wheels, in a specific embodiment of the invention. The motors can be of different types, depending on the magnitude of the maximum torque which is needed for a definite joint. For instance, brush DC coreless motors from e-Minebea™ (SE24P2CTCA for instance) can be used, or brushless DC motors from Maxon™ (EC45_70W for instance). The MREs are preferably of a type using the Hall effect, with 12 or 14 bits precision.

In embodiments of the invention, the robot displayed on FIG. 1 also comprises various kinds of sensors. Some of them are used to control the position and movements of the robot. This is the case, for instance, of an inertial unit, located in the torso of the robot, comprising a 3-axes gyroscope and a 3-axes accelerometer. The robot can also include two 2D color RGB cameras 160 on the forehead of the robot (top and bottom) of the System On Chip (SOC) type, such as those from Shenzen V-Vision Technology Ltd™ (OV5640), with a 5 megapixels resolution at 5 frames per second and a field of view (FOV) of about 57° horizontal and 44° vertical. One 3D sensor 170 can also be included behind the eyes of the robot, such as an ASUS XTION™ SOC sensor with a resolution of 0.3 megapixels at 20 frames per second, with about the same FOV as the 2D cameras. The robot of the invention can also be equipped with laser line generators, for instance three in the head 180a and three in the base 180b, so as to be able to sense its relative position to objects/beings in its environment. In other embodiments of the invention, the robot only has laser line generators in the base. The robot of the invention can also include microphones to be capable of sensing sounds in its environment. In an embodiment, four microphones with a sensitivity of 300 mV/Pa+/−3 dB at 1 kHz and a frequency range of 300 Hz to 12 kHz (−10 dB relative to 1 kHz) can be implanted on the head of the robot. The robot of the invention can also include two sonar sensors 190, possibly located at the front and the back of its base, to measure the distance to objects/human beings in its environment.

The robot can also include tactile sensors, on its head and on its hands, to allow interaction with human beings. It can also include bumpers 1B0 on its base to sense obstacles it encounters on its route.

The robot can also sense contact of its upper members with objects that they touch by calculating a difference between a planned trajectory and an actual trajectory. A method to this effect is disclosed by European patent application filed the same day by the same applicant under n° EP14305848.5.

To translate its emotions and communicate with human beings in its environment, the robot of the invention can also include:
  LEDs, for instance in its eyes, ears and on its shoulders;
  Loudspeakers, for instance two, located in its ears.

The robot of the invention may communicate with a base station or other robots through an Ethernet RJ45 or a WiFi 802.11 connection.

The robot of the invention can be powered by a Lithium Iron Phosphate battery with an energy of about 400 Wh. The robot can access a charging station fit for the type of battery that it includes.

Position/movements of the robots are controlled by its motors, using algorithms which activate the chains defined by each limb and effectors defined at the end of each limb, in view of the measurements of the sensors.

From sensors 160, 170, 180, 190, 1A0 or 1B0, or from the result of an evaluation of a contact of its upper members with an object, the computing modules of the robot can compute a local map of the obstacles in its environment, as disclosed by European patent application filed under n° EP14305849.3.

Figure 2:
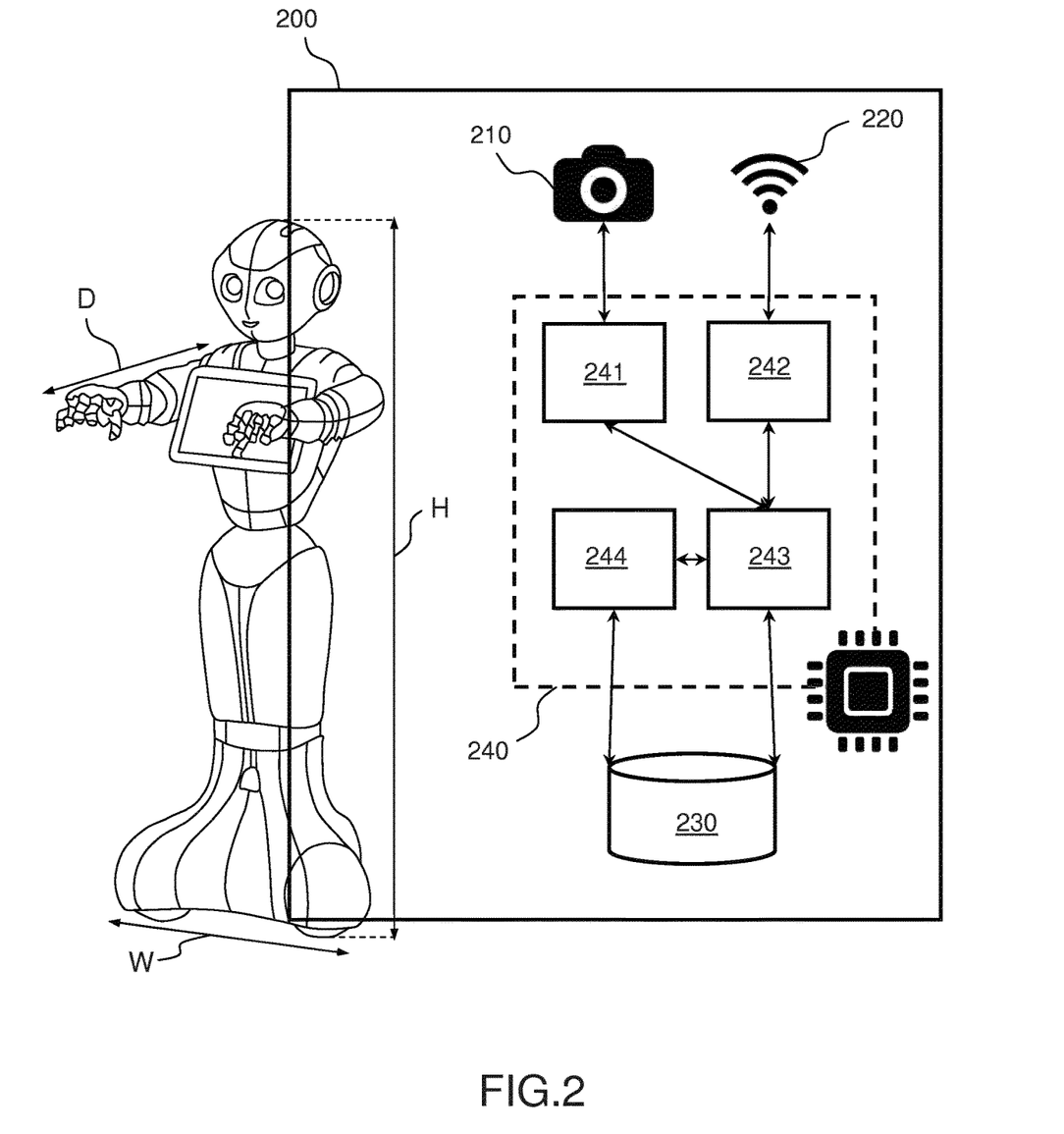
FIG. 2 displays a functional architecture of a mobile device in a number of embodiments of the invention.

FIG. 2 displays a functional architecture of a mobile device in a number of embodiments of the invention.

The mobile device 200 comprises one or more digital image sensors 210. The invention is not restricted to any type of digital image sensor. The one or more digital image sensors 210 may be any type of known image sensor, for example a semiconductor Charge-Coupled Device (CCD), a Complementary Metal-Oxide-Semiconductor (CMOS) or a N-type Metal-Oxide Semiconductor (NMOS) sensor, used alone or in combination. As discussed above, although FIG. 2 represents a robot, according to various embodiments of the invention the mobile device 200 may be any kind of mobile device, for example a robot. FIG. 1 displays an example of a robot of the invention.

The one or more image sensor 210 captures images of the environment of the mobile device. They may either capture image at a fixed rate, or upon request from the processing logic 240.

The mobile device 200 further comprises a radio receiver 220. The invention is not restricted to any type of radio receiver that allows detecting and identifying radio transmitters. For example, the radio receiver 220 may be a Wi-Fi module, a Bluetooth module, a Zigbee module, or a combination thereof.

The mobile device 200 further comprises a communication link to one or more memories 230. According to various embodiments of the invention, the one or more memories 230 may be either embedded onboard the mobile device 200, located on a distance device accessed wirelessly, or a combination thereof.

The one or more memories 230 store a set of visual words. As discussed above, a visual word provides a vocabulary to describe the contents of image captured by the one or more image sensors 210. The invention is not restricted to any vocabulary or set of visual words that allows describing the content of the image. For example, Sivic, J., & Zisserman, A. (2003, October). *Video Google: A text retrieval approach to object matching in videos*. In null (p. 1470). IEEE. discloses a suitable method for defining visual words.

The one or more memories 230 further store a set of radio words. According to various embodiments of the invention, a radio word can be defined by any data relative to a radio transmitter. For example a radio word can be defined by an identifier of a radio transmitter. An identifier of a radio transmitter can be any information that allows an identification of the radio transmitter that has transmitted a radio signal. For example, a radio word may be defined by a MAC address of a Wi-Fi Access Point, an address of a Bluetooth device, or an address of a Zigbee device.

In a number of embodiments of the invention, the mobile device detects radio transmitters using a single protocol, for example only Wi-Fi Access Points, Bluetooth devices, or Zigbee devices. In other of embodiments of the invention, the mobile device detects radio transmitters using different protocols, for example both Wi-Fi Access Points, Bluetooth devices and Zigbee devices. This allows the mobile device to locate itself using a larger number of sources. In such embodiments, the radio word can also define, in addition of the address of the device, the protocol used. In a number of embodiments of the invention, a radio word is defined by a combination of an identifier of a radio transmitter, and a range of signal strength of the radio signal received by the mobile device from the radio transmitter. This allows defining a plurality of radio words for a single radio transmitter, for different ranges of signal receptions. According to various embodiments of the invention, any scale of signal strength can be used. For example, radio words can be defined for Wi-Fi Access Points as a combination of a MAC address of a Wi-Fi Access Point, and a strength of the Wi-Fi signal expressed in mW (milliwatts), dBm (decibels relative to milliwatt) or a RSSI (Received Signal Strength Indication) scale, that can range for example from 0 to 255. According to various embodiments of the invention, any suitable combination of identifier of radio transmitter, and signal strength range can be used.

For example, a radio word corresponding to a Wi-Fi Access Point can be defined by a MAC address $M_1$, for a signal strength range of [0 dBm; −10 dBm[, a second radio word for the same Wi-Fi Access Point by the same MAC address $M_1$, received with a signal in a range of [−10 dBm; −20 dBm[, etc. . . . . In a number of embodiments of the invention, the signal strength corresponds to a Received Signal Strength Indication (RSSI).

According to various embodiments of the invention, the set of radio words can be managed in a number of different ways.

For example, the set of radio words can be built during a single training phase, comprising a detection of radio transmitters during an exploration of an environment of the mobile device. This embodiment can be used for example for a mobile device that moves in a store, or more generally a commercial indoor environment. During the day, a lot of persons can also move in this environment, while carrying radio transmitters (this is for example the case with smartphones using the popular Wi-Fi hotspot function, or smartphones that have the Bluetooth activated). These radio transmitters could generate additional radio words in the set of radio words, that correspond to radio transmitters that would be either mobile, or disappear. Such a set would reduce the efficiency of the localization method. In order to overcome this issue, the mobile device can explore its environment at night, when only fixed radio transmitters are active, and add only radio words corresponding to these fixed radio transmitters to the set of radio words.

In a number of embodiments of the invention, a radio word can be added each time a new radio transmitter is detected.

However, it should be noted that the invention is not restricted to these examples, and any suitable method of managing the set of radio words can be used.

The one or more memories 230 further store a set of reference locations. In this application, each reference location will be noted Li, i being an index of the location. However, the invention is not restricted to this convention, and any reference that allows identifying the locations in the topological map can be used.

The one or more memories 230 further store, for each Location Li, a reference location vector. A reference location vector defines, for each location, which visual words and radio words are present or absent at the reference location. For example, the reference location vector can be formed of binary values, each binary value defining the presence or absence of a visual word or a radio word. A reference location vector can be built based on visual observations and radio reception at the location Li, and by determining which visual words and radio words are present in the location therefrom.

Each location thus forms a topological node, associated with a reference location vector generated from one or more observations performed at the reference location. The observations comprise both visual and radio observations. These two types of observations are performed using different sensors, visual observations being usually collected at a higher rate than radio observations. According to various embodiments of the invention, the visual and radio observations can be merged into a single reference location vector in a number of different ways. For example, during an exploration stage, visual observations can be associated to the closest radio observation. The distance between visual and radio observations can be calculated for example by odometry, or by comparing timestamps of observations, and adding to a radio observation vector a visual observation vector which is the closest in time.

The mobile device 200 further comprises a communication link to a processing logic 240. According to various embodiments of the invention, the processing logic 240 may be either located onboard the mobile device, or in a distant machine and accessed remotely. The latter case can be performed for example, if the mobile device is controlled from a control device, which may be for example a smartphone, a server or a personal computer.

The processing logic 240 comprises an adaptation 241 to acquire an image of an environment from said one or more digital image sensors. In a number of embodiments of the invention, the adaptation 241 receives an image periodically from the one or more digital image sensors 210. For example, the adaptation 241 may receive 25 images per second. In other embodiments of the invention, the adaptation 241 sends commands to the one or more image sensors 210 to capture images whenever necessary. In embodiments wherein the mobile device comprises more than one digital image sensor, the adaptation 241 can be configured to assemble images received from the plurality of digital image sensors into a single image.

The processing logic 240 further comprises an adaptation 242 to detect receivable radio transmitters using the radio receiver 220. In a number of embodiments of the invention, the radio receiver 220 is a Wi-Fi module which periodically collects a Wi-Fi signature, that comprises a list of receivable wireless Access Points with the corresponding MAC addresses, as well as the strengths at which the signal is received (RSSI).

The processing logic further comprises an adaptation 243 to create an observation vector defining the presence or absence of visual words in the image, and the presence or absence of radio words using receivable radio transmitters. An observation vector will be generally denoted Z in the current description.

The observation vector thus indicates which visual words and radio words are detected by the mobile device in its current location. Similarly to the reference location vectors, the invention is not restricted to any form of observation vector, and the observation vector can notably be formed of binary values indicating the presence or absence of each visual word in the image, and each radio word according to the receivable radio transmitters.

In order for the visual and radio observations to be consistent, the visual and radio observations need to be performed within the same time frame. In a number of embodiments of the invention, an observation vector is formed from visual and radio observations if their capture time is below a predefined threshold. Usually, visual observations are performed at a higher rate than radio observations. In a number of embodiments of the invention, radio observations indicating the receivable radio transmitters are performed periodically by the adaptation 242, and an observation vector is created, at each time step, from the radio observation and the visual observation which has been captured by the one or more image sensors 210 at the closest time. The determination of the visual observation that has been captured at the closest time can be performed for example by comparing timestamps of visual and radio observations.

The detection of visual words can be performed in a number of different ways. For example, the bag-of-words approach described by Sivic, J., & Zisserman, A. (2003, October). Video Google: A text retrieval approach to object matching in videos. In *Computer Vision*, 2003. *Proceedings Ninth IEEE International Conference on* IEEE pp. 1470-1477 can be used. This approach consists in extracting descriptors of keypoints of the image, and associating these descriptors to words of a vocabulary. Thus, if a vocabulary contains N visual words, an observation vector Z (as well as reference location vectors) will contain N binary values indicating the presence or absence of a corresponding visual word in the image.

In a number of embodiments of the invention, the vocabulary comes from an offline learning phase, and can be built for example by using a clustering method such as k-means on keypoint descriptors extracted from a large database of images. The database may be formed either from randomly selected images, or images that are similar to those of the environment of the mobile device. For example, if the mobile device is intended to operate in an office environment, the set of visual words can be built using a database of images of indoor offices. However, the invention is not restricted to any particular means of building a vocabulary of visual descriptors, and any suitable vocabulary can be used. The offline learning phase may be performed by a number of different devices, for example the mobile device itself, a computer, or a server.

The processing logic 240 further comprises an adaptation 244 to determine the current location of the mobile device at least among the set of reference locations based on said observation vector and said reference locations vectors.

In a number of embodiments of the invention, the reference location which is the most relevant is selected as the current location of the mobile device.

The determination of the current location of the mobile device can be performed in a number of different ways. For example, a likehood of observing the observation vector can be calculated for each reference location. This can be performed in a number of different ways. Generally speaking, the higher similarity between the observation vector and a reference location vector, the more chance has the mobile device to be in the corresponding reference location. For example, the number of words which are present in the same time in the observation vector and a reference location vector can be calculated, and the current location of the mobile device is determined has the reference location whose reference location vector has the highest number of words in common with the observations vector.

In a number of embodiments of the invention, the adaptation 244 uses the correlations that exist between words in observations. For example, certain visual words are often detected in the same time, and the detection in the same time of these visual words is a strong indication that the robot may be in certain reference locations. Similarly, some correlations can be determined between radio words, when radio words correspond to radio transmitters that are located in close places, and thus often detected in the same time.

In a number of embodiments of the invention, the, the adaptation 244 calculates, for each reference location, a likehood of observing the observation vector when the mobile device is in the reference location, based on the observation vector, the corresponding reference location vector, and a correlation tree that indicates the correlation between the detection of visual and/or radio words. In a number of embodiments of the invention, the tree is a Chow-Liu tree. An example of such detection is provided with greater details is provided with reference to FIG. 3.

In other embodiment of the invention, the adaptation 244 is configured, when none of the current reference locations matches the observation vector, to detect that the mobile device is in an unknown location. In this case, the processing logic further comprises an adaptation to add a reference location, whose reference location vector is the current observation vector.

Figure 3:
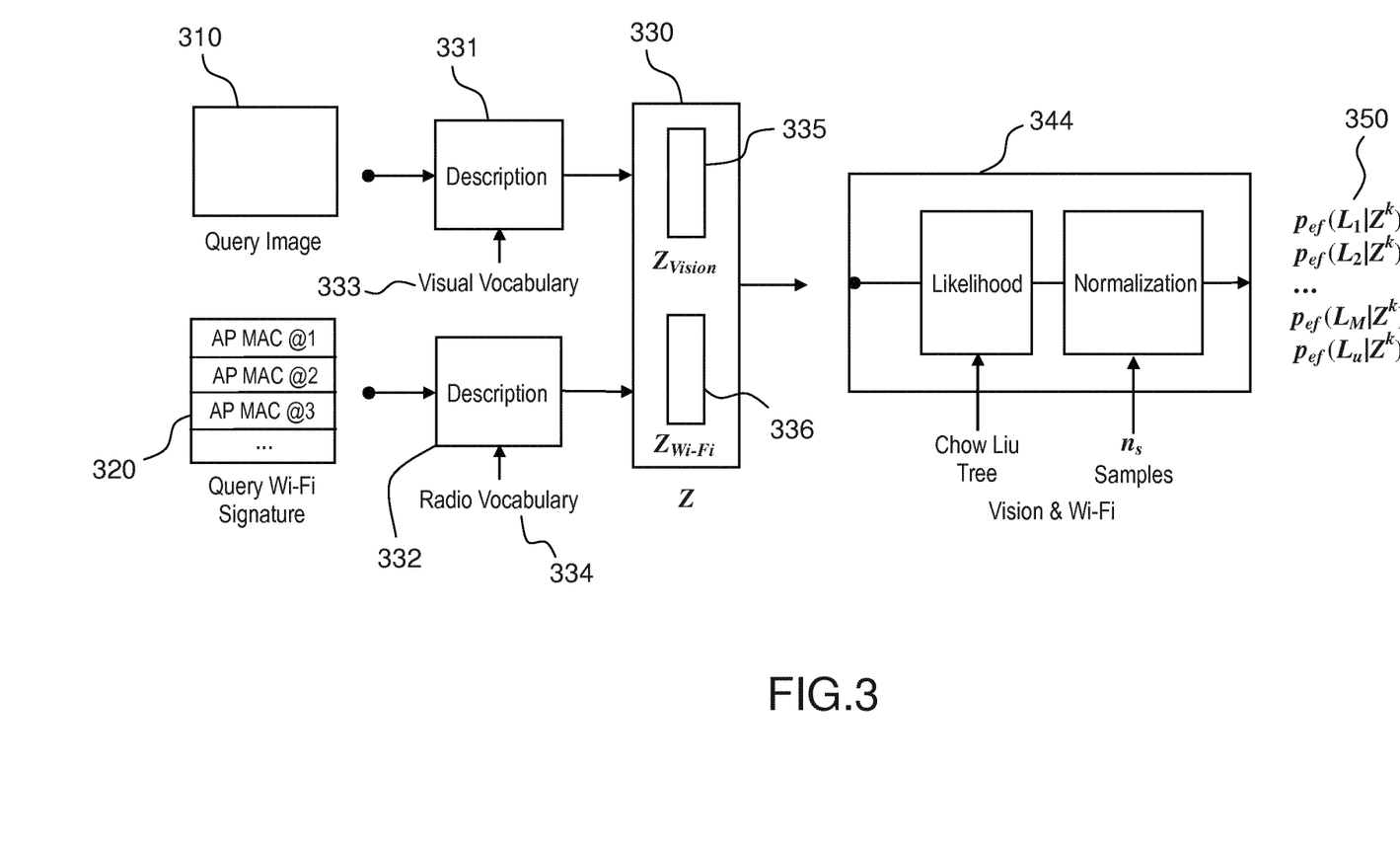
FIG. 3 displays a flow chart representing the operations on data structures in a number of embodiments of the invention.

FIG. 3 displays a flow chart representing the operations on data structures in a number of embodiments of the invention.

The operations discussed with reference to FIG. 3 are provided by means of example only, and do not limit in any way the scope of the invention. The example provided in FIG. 3 relies on the use of a Chow-Liu tree to define correlations between the words, and computes a probability for the mobile device to be in each reference location based on the observation vector. In the example of FIG. 3, the robot locates itself using a combination of images and Wi-Fi. Therefore, in the example of FIG. 3, the radio words are defined in relation to Wi-Fi Access Points only. As highlighted above, the invention is also applicable to other kinds of radio transmitters, and different types of radio transmitters could be detected by the same mobile device.

The operations on data structures displayed at FIG. 3 can be performed at successive time steps, a time step being noted k, with k=1, 2, 3, . . . .

As discussed above, an image 310 is acquired by the adaptation 241, and receivable wireless Access Points are detected by the adaptation 242, for example in the form of a Wi-Fi signature 320.

The adaptation 243 identifies the visual words 331 that are present in the image 310 from the set of visual words 333. It furthermore identifies the radio words 332 that are present in the Wi-Fi signature 334. Finally, the adaptation 243 forms at step k an observation vector $Z_k$ 330 comprising binary values indicating the presence or absence of each visual word and radio word.

As discussed above, in a number of embodiments of the invention the radio words are defined only by the MAC address of the Wi-Fi Access Point. In this case, a radio word is present if an Access Point with the corresponding MAC address is present in the Wi-Fi signature 320. In other embodiments of the invention, a radio word is characterized by both a MAC address, and a range of signal strength. In this case, the radio word is present if the Wi-Fi signature comprises a Wi-Fi Access Point having the corresponding MAC address and signal strength, as defined for example by a RSSI.

In the example of FIG. 3, the observation vector $Z_k$ is formed from a concatenation of a visual observation vector $Z_{vision}$, and a Wi-Fi observation vector $Z_{Wi-Fi}$. The size of the vector $Z_{vision}$ is equal to the size of the set of visual words 333, and the size of the vector $Z_{Wi-Fi}$ is equal to the number of Wi-Fi words in the set of radio words 334.

Once the observation vector is obtained, the adaptation 244 computes for each reference location $L_i$ the probability $p(Z_k|L_i)$ that the vector $Z_k$ is observed when the mobile device is in the location $L_i$. This probability is calculated using a Chow-Liu tree that captures correlations between the different words of vocabulary. In a number of embodiments of the invention, two separate Chow-Liu trees are used: one for capturing the correlations between visual words, and one for capturing the correlations between radio words.

In a number of embodiments of the invention, the adaptation 244 also computes a probability to obtain the observation vector when the mobile device is in an unknown location. This operation, also noted "normalization" ensures that an observation vector may not have been obtained from an unknown location. This is especially helpful when the mobile device has not fully explored its environment.

This can be done for visual words by using a database of images from real locations forming an arbitrary unknown world, and detecting the visual words that are present in these images in order to obtain a set of unknown world reference location vectors. Then, the probability for the observation vector to be obtained from an unknown location can be calculated as the sum of probabilities to obtain the observation vector from each unknown world reference location vectors.

This solution is satisfying for visual words. Indeed, visual words are representative of objects or shapes that are found in images from a number of different sources and locations. Thus, such visual words from the set of visual words can be identified in images from any source, thereby providing suitable unknown world reference location vectors. However, using the same method with radio words would not be efficient. Indeed, radio signals, for example Wi-Fi signatures collected randomly have, in practice, no chance of containing any radio word related to the environment of the mobile device, since the identifiers of radio transmitters, for example Wi-Fi MAC address collected in random places would, by definition, be different of the identifiers of radio transmitters collected in the environment of the mobile device.

In order to overcome this issue, a set of unknown world reference location vectors related to radio words can be built by generating random distributions of the radio words based at least on the set of radio words 334. For example, it is possible to compute the mean μ and standard deviation σ of the number of Access Points perceived in the Wi-Fi signatures collected when the mobile device explores its environment, to obtain a normal distribution N(μ, σ) of the number of Access Points perceived in a Wi-Fi signature. Thus, a number $n_s$ of virtual locations can be defined by generating Wi-Fi signatures whose size follows the normal distribution N(μ, σ), and verifying the radio words that are present in the Wi-Fi signature in order to build artificial reference location vector relative to the unknown world. According to various embodiments of the invention, the Wi-Fi signature could be built using wireless Access Points corresponding to the set of radio words 334 only, or a combination of wireless Access Points corresponding to the set of radio words 334 and wireless Access Point from unknown locations.

At the output of the normalization, the adaptation 244 can calculate the probabilities of being in each location Li, for example using the formula below:

$$p(L_i | Z^k) = \frac{p(Z_k | L_i, Z^{k-1})p(L_i | Z^{k-1})}{p(Z_k | Z^{k-1})}$$

wherein:
$Z_k$ is the observation vector at step k;
$Z^k$ is the set of observations vectors up to step k (and, conversely, $Z^{k-1}$ is the step of observations vectors up to step k−1);
$p(Z_k|L_i,Z^{k-1})$, which can be noted more simply $p(Z_k|L_i)$ is the probability of observing the observation vector at step k from the location $L_i$;
$p(L_i|Z^{k-1})$ is the probability of being in the location $L_i$ based on the set of observations $Z^{k-1}$ at previous time step. This term thus uses the knowledge of previous locations, and relations between topological nodes to provide an insight on the current location;
$p(Z_k|Z^{k-1})$, also called normalization term, provides a global probability of observing the observation vector $Z_k$ based on the set of previous observation vectors $Z^{k-1}$.
The terms $p(L_i|Z^{k-1})$ and $p(Z_k|Z^{k-1})$ of this normalization step can be calculated for example in a way similar to the normalization used in FABMAP algorithm disclosed by Cummins, M., & Newman, P. (2008). FAB-MAP: Probabilistic localization and mapping in the space of appearance. *The International Journal of Robotics Research*, 27(6), 647-665 and Cummins, M., & Newman, P. (2011). Appearance-only SLAM at large scale with FAB-MAP 2.0. *The International Journal of Robotics Research*, 30(9), 1100-1123.

At the output of the normalization, the adaptation 344 calculates a set 350 of probabilities $p(L_i, Z^k)$, $p(L_2, Z^k)$ ... that the mobile device is in each reference location $L_1$, $L_2$ ... based on the observation vector $Z_k$, and observation vectors at the preceding steps. The location having the highest probability can thus be selected as the current location. Using the normalization term in the equation above, the sum of all probabilities is equal to 1.

In cases wherein the unknown location is selected as the location having the highest probability, it can be understood that the mobile device is in a location that has not been previously explored. Thus, a new reference location can be added, having as reference location vector the current observation vector $Z^k$.

In some cases, when the mobile device explores new locations of its environment, new wireless Access Points, which are not present in the set of radio words 334, can become receivable. In this case, in addition of the radio words which are present in the set 334, the Wi-Fi signature 320 can contain new wireless Access Points. In this case, a corresponding radio word can be defined and added to the set of radio words 334. All reference location vectors shall thus be extended with a new binary value defining the presence or absence of the newly defined radio word in each reference location. It can be assumed that the radio word is present in the current location, where it has been detected, and absent in all other reference locations, since the mobile device had already visited the other reference locations, without detecting this new wireless Access Point. Therefore, a binary value defining the presence of the new radio word can be added to the reference location vector of the current location, and a binary value defining the absence of the new radio word in all other reference location vectors.

This example is provided by means of example only of an embodiment of the invention within the framework of the FABMAP algorithm. However, the invention is not restricted to this example, and could be implemented for example within any topological location framework, using if necessary an adaptation of the definition of visual and/or Wi-Fi words.

Figure 4:
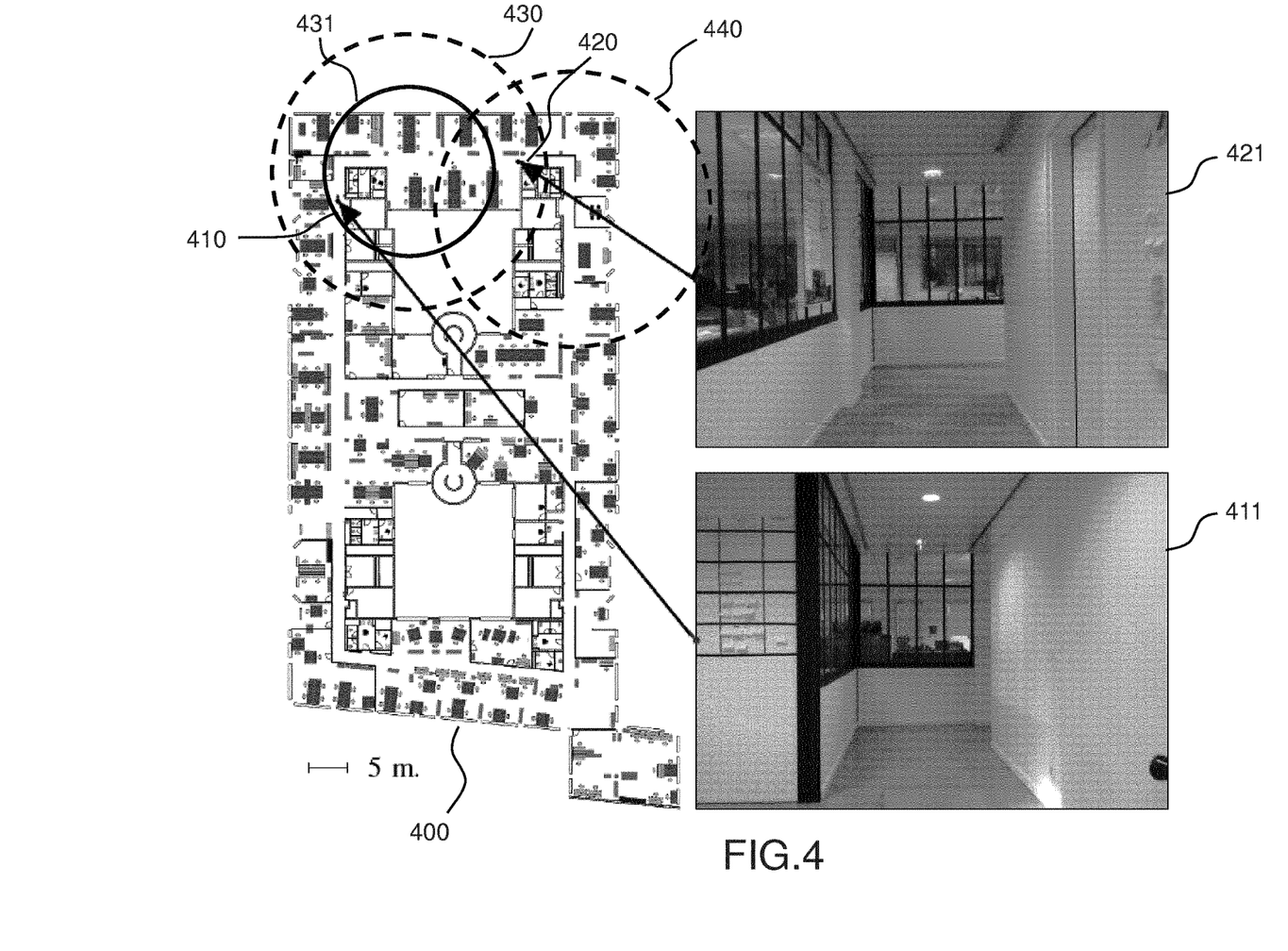
FIG. 4 displays a map and two images of an environment of a mobile device according to the invention.

The FIG. 4 displays a map and two images of an environment of a mobile device according to the invention.

The environment 400 is the floor of an office building. Topological nodes can define a number of locations in the office building, for example a first location 410 and a second location 420. The image 411 provides a view of the first location 410, and the image 421 a view of the second location 420. As displayed in the FIG. 4, the images 421 and 422 are very similar and share a number of visual features. This situation is very common in office environments.

However, this renders a localization based only on visual features very difficult to perform, since it is difficult to discriminate locations such as the first location 410 and the second location 420 based on visual features.

Signals received from radio transmitters can provide a precious insight to correctly identify the location of the mobile device in such environment.

For example, a Wi-Fi Access Point is receivable within the range 430, and Bluetooth signal emitted by a fixed Bluetooth device receivable in the range 440. Therefore, when the mobile device is in the location 410, it detects the Wi-Fi wireless Access Point only, while, when the mobile device is in the second location 420, it detects both the Wi-Fi Access Point and the fixed Bluetooth device. This information is robust and does not suffer occlusion from the walls in the office. A mobile device of the invention is thus able to discriminate between the first and the second location using this information, as disclosed above.

In a number of embodiments of the invention, the use of the signal strength of the radio signal (for example through the RSSI field of Wi-Fi signature for signal received from a Wi-Fi Access Point) allows a further refinement of radio information.

For example, the signal from the Wi-Fi Access Point can be received with a strength higher than −30 dBm within the range 431, and a signal strength lower than −30 dBm between the ranges 431 and 430. Therefore, two separate radio words can be defined for receiving signal form the Wi-Fi Access Point, at a strength lower or higher than −30 dBm. In this example the signal is received with a signal strength higher than −30 dBm in the first location 410, and a strength lower than −30 dBm in the second location 420. Therefore, this information allows a further discrimination of the location of the mobile device, between the first location 410 and the second location 420.

Figure 5A:
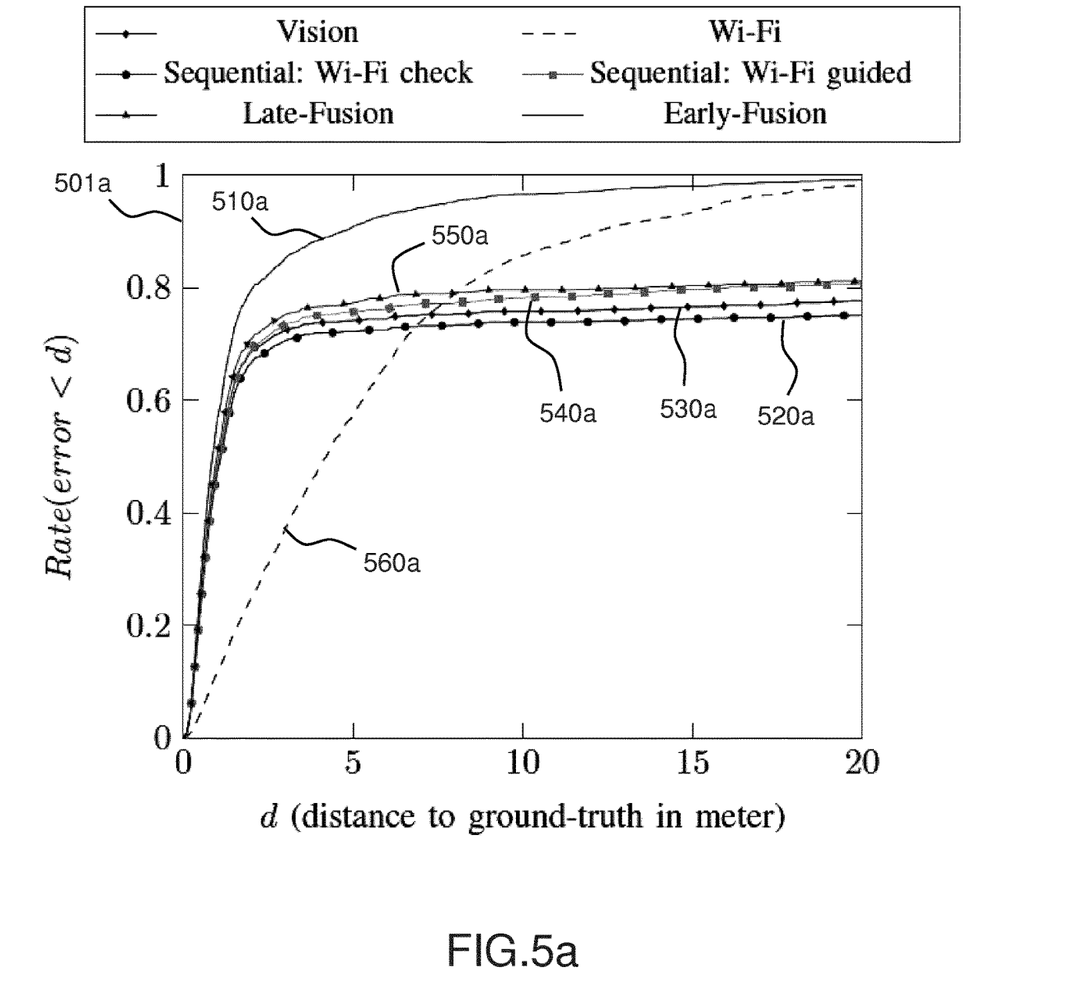
FIGS. 5a and 5b display two examples of localization error rates of mobile device localization methods using a combination of vision and/or Wi-Fi information, according to the invention and the prior art.
Figure 5B:
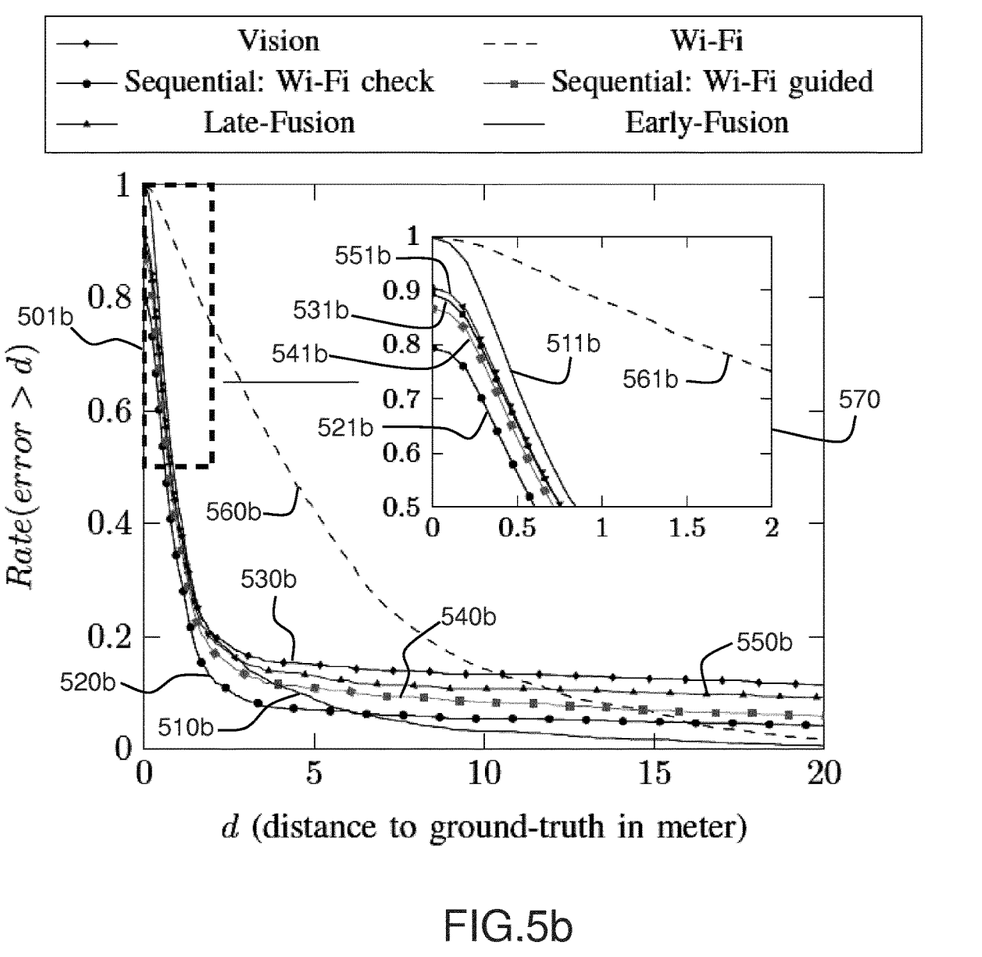

The FIGS. 5*a* and 5*b* display two examples of localization error rates of mobile device localization methods using a vision and/or Wi-Fi information, according to the invention and the prior art.

The FIGS. 5*a* and 5*b* more specifically display the error rate (i.e the relative amount of false locations) of different location methods using a combination of visual and Wi-Fi information depending on a distance d between estimated pose of the mobile device corresponding to the associated topological node) and the real pose of the mobile device (corresponding to its exact location). The examples displayed in FIGS. 5*a* and 5*b* are more specifically relative to robot localization.

The vertical axes 501*a* and 501*b* represent the error rate, as a division of a number of false localizations during an experimental test by the total number of localization during the test. The direction of the axis 501*b* is inverted compared to the direction of the axis 501*a*, and the vignette 570 represents a zoom to the low distances and low error rates.

In the FIGS. 5*a*, and 5*b*, the curves represent respectively:
 curves 510*a*, 510*b* and 511*b*: the variation of error rate depending of the distance of a localization method according to the invention;
 curves 520*a*, 520*b* and 521*b*: the variation of error rate depending of the distance of a localization method which sequentially performs a visual localization, then checks the localization based on Wi-Fi information;
 curves 530*a*, 530*b* and 531*b*: the variation of error rate depending of the distance of a localization method based on visual information only;
 curves 540*a*, 540*b* and 541*b*: the variation of error rate depending of the distance of a localization method a Wi-Fi based localization, then refines this localization using visual information;
 curves 550*a*, 550*b* and 551*b*: the variation of error rate depending of the distance of a localization method that performs separately a Wi-Fi based localization, and a visual-based localization, then fuse information using a particle filter;
 curves 560*a*, 560*b* and 561*b*: the variation of error rate depending of the distance of a localization method based on Wi-Fi only.

The FIGS. 5a and 5b clearly show that the localization method of the invention provides localization results which are significantly better than all other visual, Wi-Fi or mixed method, at all distances.

Figure 6:
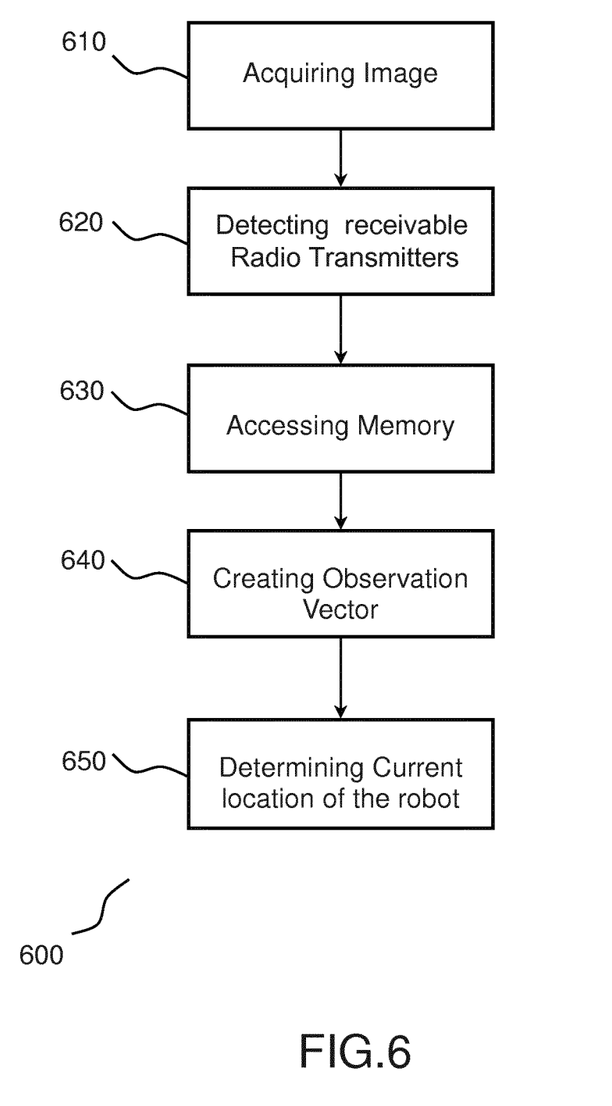
FIG. 6 displays an example of method according to the invention.

FIG. 6 displays an example of method according to the invention.

The method 600 is a method to locate a mobile device in its environment.

The method 600 comprises a first step 610 of acquiring an image of the environment of a mobile device from one or more digital image sensors onboard the mobile device.

The method 600 further comprises a second step 620 of detecting receivable radio transmitters using a radio receiver onboard said mobile device.

The method 600 further comprises a third step 630 of accessing a memory storing: a set of visual words, a set of radio words, a radio word being defined at least by an identifier of the radio transmitter and a set of reference locations, each reference location having associated therewith a reference location vector comprising binary values defining the presence or absence, at the corresponding reference location, of visual words and radio words.

The method 600 further comprises a fourth step 640 of creating an observation vector comprising binary values defining the presence or absence of visual words in the image, and binary values defining the presence or absence of radio words using receivable wireless radio transmitters.

The method 650 further comprises a fifth step of determining if a current location of the mobile device is in one of said reference locations based on said observation vector and said reference location vectors.

All the embodiments discussed with reference to FIGS. 1 to 4 are respectively applicable to the method 600.

The examples described above are given as non limitative illustrations of embodiments of the invention. They do not in any way limit the scope of the invention which is defined by the following claims.

The invention claimed is:

1. A mobile device comprising:
   one or more digital image sensors onboard the mobile device;
   a radio receiver;
   a communication link to one or more memories storing:
      a set of visual words, a visual word being representative of an object or shape found in an image;
      a set of radio words, a radio word being defined at least by an identifier of a radio transmitter;
      a set of reference locations, each reference location having associated therewith a reference location vector comprising binary values defining respectively the presence or absence, at the corresponding reference location, of visual words and radio words;
   a communication link to a processing logic comprising:
      an adaptation to acquire an image of an environment of the mobile device from said one or more digital image sensors onboard the mobile device;
      an adaptation to detect receivable radio transmitters using said radio receiver;
      an adaptation to create an observation vector comprising binary values defining the presence or absence of visual words in the image acquired from said one or more digital image sensors onboard the mobile device, and binary values defining the presence or absence of radio words in receivable radio transmitters;
      an adaptation to determine the current location of the mobile device at least among the set of reference locations based on said observation vector and said reference locations vectors,
   wherein said adaptation to determine the current location of the mobile device comprises:
      an adaptation to compute, for each reference location, a likelihood of observing the observation vector, when the mobile device is in said reference location, based on said reference location vector and correlations between elements of observations and reference vectors, the correlations of elements associated to visual words and of elements associated to radio words being separately computed; and
      an adaptation to compute a probability of observing the observation vector, when the mobile device is in an unknown location, based on a set of artificial reference location vectors built using an artificial list of receivable radio transmitters generated from at least the set of radio words.

2. The mobile device of claim 1, wherein said calculation, for said reference location vector, of the likelihood of observing the observation vector when the mobile device is in the corresponding reference location is based on the observation vector, the reference location vector, and a correlation tree of elements of the observation and reference location vectors.

3. The mobile device of claim 1, wherein the processing logic further comprises, when said adaptation to determine if a current location of the mobile device is in one of said reference locations has determined that the mobile device is in none of said reference locations, an adaptation to add a further reference location having as reference location vector the observation vector in the set of reference locations.

4. The mobile device of claim 1, to wherein the set of radio words is built during a single training phase, comprising a detection of radio transmitters during an exploration of said environment.

5. The mobile device of claim 1, wherein the processing logic further comprises, when said adaptation to detect receivable radio transmitters using said radio receiver has detected a receivable radio transmitter associated to none of the radio words, an adaptation to add a radio word associated to said receivable radio transmitter in said set of radio words.

6. The mobile device of claim 5, wherein the processing logic further comprises, when said adaptation to determine if a current location of the mobile device is in one of said reference locations has determined that the mobile device is in none of said reference locations, an adaptation to add a further reference location having as reference location vector the observation vector in the set of reference locations and
   wherein said adaptation to add a radio word associated to said receivable radio transmitter comprises an adaptation to modify the reference location vectors to add:
   a binary value indicating the presence of said radio word in the reference vector corresponding to current location;
   a binary value indicating the absence of said radio word in each other reference location.

7. The mobile device of claim 1, wherein:
   the radio words are further defined by a range of signal strength received from the corresponding radio transmitter;
   said adaptation to create an observation vector comprises an adaptation to indicate that a radio word is present in the observation vector, if the radio receiver receives a signal from a corresponding radio transmitter with a corresponding signal strength.

8. The mobile device of claim 1, wherein said adaptation to determine the current location of the mobile device further comprises adaptations to:
calculate probabilities that the mobile device is in each reference location based on said observation vector and said reference location vectors;
determine that the current location of the mobile device is the reference location having the highest probability.

9. The mobile device of claim 8, wherein:
said adaptation to calculate probabilities that the mobile device is in each reference location furthermore comprises an adaptation to calculate a probability that the mobile device is in an unknown location;
the sum of the probabilities that the mobile device is in the reference locations, and the probability that the mobile device is in an unknown location is equal to 1.

10. A method comprising:
acquiring an image of the environment of a mobile device from one or more digital image sensors onboard the mobile device;
detecting receivable radio transmitters using a radio receiver onboard said mobile device;
accessing a memory storing:
a set of visual words, a visual word being representative of an object or shape found in an image;
a set of radio words a radio word being defined at least by an identifier of a radio transmitter; and
a set of reference locations, each reference location having associated therewith a reference location vector comprising binary values defining the presence or absence, at the corresponding reference location, of visual words and radio words;
creating an observation vector comprising binary values defining the presence or absence of visual words in the image acquired from said one or more digital image sensors onboard the mobile device, and binary values defining the presence or absence of radio words in receivable radio transmitters;
determining if a current location of the mobile device is in one of said reference locations based on said observation vector and said reference location vectors, said determining comprising:
computing, for each reference location, a likelihood of observing the observation vector, when the mobile device is in said reference location, based on said reference location vector and correlations between elements of observations and reference vectors, the correlations of elements associated to visual words and of elements associated to radio words being separately computed;
computing a probability of observing the observation vector, when the mobile device is in an unknown location, based on a set of artificial reference location vectors built using an artificial list of receivable radio transmitters generated from at least the set of radio words.

11. A non-transitory, computer-readable medium comprising instructions that when executed by a processor cause the processor to:
acquire an image of the environment of a mobile device from one or more digital image sensors onboard the mobile device;
detect receivable radio transmitters using a radio receiver onboard said mobile device;
access a memory storing:
a set of visual words, a visual word being representative of an object or shape found in an image;
a set of radio words, a radio word being defined at least by an identifier address of a radio transmitter;
a set of reference locations, each reference location having associated therewith a reference location vector comprising binary values defining the presence or absence, at the corresponding reference location, of visual words and radio words;
create an observation vector comprising binary values defining the presence or absence of visual words in the image acquired from said one or more digital image sensors onboard the mobile device, and binary values the presence or absence of radio words using receivable radio transmitters;
determine if a current location of the mobile device is in one of said reference locations based on said observation vector and said reference location vectors, by:
computing, for each reference location, a likelihood of observing the observation vector, when the mobile device is in said reference location, based on said reference location vector and correlations between elements of observations and reference vectors, the correlations of elements associated to visual words and of elements associated to radio words being separately computed;
computing a probability of observing the observation vector, when the mobile device is in an unknown location, based on a set of artificial reference location vectors built using an artificial list of receivable radio transmitters generated from at least the set of radio words.

* * * * *